United States Patent [19]

Kamigaito et al.

[11] 4,384,989
[45] May 24, 1983

[54] SEMICONDUCTIVE BARIUM TITANATE

[75] Inventors: Osami Kamigaito; Tatsumi Hioki, both of Nagoya; Nobuyuki Yamamoto, Seto; Yoshiharu Hirose; Haruo Doi, both of Nagoya, all of Japan

[73] Assignee: Kabushiki Kaisha Toyota Chuo Kenyusho, Aichi, Japan

[21] Appl. No.: 373,817

[22] Filed: Apr. 30, 1982

[30] Foreign Application Priority Data

May 6, 1981 [JP] Japan .................................. 56-67792
Dec. 25, 1981 [JP] Japan .............................. 56-212205

[51] Int. Cl.$^3$ .............................................. H01B 1/08
[52] U.S. Cl. ............................ 252/516; 252/62.3 BT; 252/518; 252/520; 252/521; 501/137; 501/139
[58] Field of Search ................ 252/62.3 BT, 516, 520, 252/518, 521; 501/137, 139

[56] References Cited

U.S. PATENT DOCUMENTS 4,347,167  8/1982  Payne et al. ............ 252/62.3 BT X

FOREIGN PATENT DOCUMENTS 46-43876 12/1971 Japan .................................. 252/520
47-21869  6/1972 Japan .................................. 252/520
47-22507  6/1972 Japan .................................. 252/520
54-139620 10/1979 Japan .................................. 501/137

Primary Examiner—Jack Cooper
Attorney, Agent, or Firm—Blum, Kaplan, Friedman, Silberman and Beran

[57] ABSTRACT

Semiconductive barium titanate having a positive temperature coefficient of resistance comprises a barium titanate semiconductor including barium titanate and a small quantity of a doping element, and at least one additive selected from among silicon nitride, titanium nitride, zirconium nitride and silicon carbide. The semiconductive barium titanate of this invention has a sharp rise in the variation of specific resistivity with temperature change and a large specific resistivity ratio in the PTC temperature region, and can be produced with high reproducibility, since a widely differing quantity of the doping element can be effectively added to barium titanate.

11 Claims, 3 Drawing Figures

SEMICONDUCTIVE BARIUM TITANATE

BACKGROUND OF THE INVENTION

1. Field of the Invention

This invention relates to semiconductive barium titanate having a positive temperature coefficient of resistance, and which is widely used as material for temperature or electric current control, or other purposes.

2. Description of the Prior Art

Barium titanate is known as an insulator having a high specific resistivity of at least $10^{10}$ $\Omega$cm. Semiconductive ceramics having a low a specific resistivity as, say, 10 to $10^2$ $\Omega$cm at ordinary room temperature are obtained of barium titanate is baked in the presence of a small quantity of at least one oxide of any such element as yttrium and other rare earth elements, antimony (Sb), niobium (Nb), bismuth (Bi) and tantalum (Ta), or if barium titanate is baked in a reducing atmosphere and rendered semiconductive, and the sintered product of such barium titanate is oxidized only in its intergranular region. These semiconductive barium titanate ceramics are characterized by showing reversibly a sharp rise in electrical specific resistivity from a low level at a temperature lower than a point corresponding to the Curie temperature of barium titanate to a high level at a higher temperature. Due to these positive temperature coefficients (PTC) of resistivity, semiconductive barium titanate ceramics are widely used as materials for temperature or electric current control, and other purposes.

These semiconductive ceramics are, however, not suitable for practical use, since even a slight change in the quantity of the doping element employed brings about a great change in specific resistivity, and their reproducibility is low. Their baking temperature at which the barium titanate is rendered semiconductive is high, and their grains grow so greatly that enlarged grains are very likely to form pores.

Manganese or the like is added to those semiconductive ceramics if they are used for making a switching element, a current controlled type heating element, or the like which requires a large specific resistivity ratio and a sharp rise in the variation of specific resistivity in the PTC temperature region. It is, however, necessary for this purpose to control the quantity of any such additive very minutely even in the percentage of several-thousandths, since even a very small deviation brings about a great change in the specific resistivity of ceramics at ordinary room temperature.

SUMMARY OF THE INVENTION

It is an object of this invention to provide semiconductive barium titanate having a sharp rise in the variation of specific resistivity with temperature in the PTC temperature region.

It is another object of this invention to provide semiconductive barium titanate having a large specific resistivity ratio in the PTC temperature region.

This invention resides in semiconductive barium titanate ceramics having positive temperature coefficients of resistivity which comprise a barium titanate semiconductor consisting of barium titanate and a doping element, and an additive consisting of at least one of silicon nitride, titanium nitride, zirconium nitride and silicon carbide.

According to this invention, it is possible to provide semiconductive barium titanate ceramics having a sharp rise in the variation of specific resistivity with temperature, and a large specific resistivity ratio in the PTC temperature region.

According to this invention, it is also possible to employ a widely differing quantity of the doping element effectively, and thereby manufacture high-performance semiconductive ceramics with high reproducibility.

DETAILED DESCRIPTION OF THE INVENTION

Throughout the specification and claims a number of terms are used in substantially the same way. To assist in the understanding of some of these terms and in the interpretation of the relevant text, the following definitions are provided. Each designated term is to be accorded the assigned definition in the absence of an express indication to the contrary.

doping element: element added to make barium titanate semiconductive.

PTC characteristics: characteristics that the specific resistivity increases steeply with the increase in temperature around the Curie point.

PTC temperature region: temperature range in which PTC characteristic is exhibited.

specific resistivity ratio ($\rho$max/$\rho$min): the ratio of the maximum ($\rho$max) and minimum ($\rho$min) of specific resistivity of the semiconductive ceramics in the PTC temperature region.

steepness or variation of specific resistivity with change in temperature ($\Delta\rho/\Delta T$):

$$\Delta\rho/\Delta T = (\rho\text{max} - \rho\text{min})/(T\rho\text{max} - T\rho\text{min})$$

where $T\rho$max: temperature at which the maximum specific resistivity is observed; and $T\rho$min: temperature at which the minimum specific resistivity is observed.

The semicondutive barium titanate of this invention is easy to manufacture, since its specific resistivity does not greatly change even if the proportion of the doping element, such as yttrium, is changed. Its crystal grains are small and dense, since it is able to be sintered and doped at a lower temperature than any known semiconductive barium titanate ceramics. A sharp rise in the variation of specific resistivity and a large specific resistivity ratio in the PTC temperture region can be obtained with a widely differing quantity of the doping element.

The semiconductive barium titanate of this invention can be produced if barium powder containing appropriate amount of doping element is mixed with at least one additive selected from among the powders of silicon nitride, titanium nitride, zirconium nitride and silicon carbide, and the mixture is baked in the air. If silicon nitride is used as the additive, it is advisable to add 0.01 to 5.0% by weight thereof, while in the case of titanium nitride, zirconium nitride or silicon carbide, it is preferable to employ 0.1 to 2.0% by weight thereof, since these ranges ensure the production of semiconductive barium titanate having low resistivity at ordinary room temperature.

Barium titanate can, for example, be prepared from barium carbonate ($BaCO_3$) and titanium oxide ($TiO_2$).

Although other materials can be used, no intended semiconductor can be obtained if the materials contain a large quantity of impurities. It is said that impurities, such as iron, copper, potassium, sodium, magnesium and aluminum, have a particularly adverse effect on the formation of semiconductive barium titanate. It is possible to use as the doping element at least one of the elements having a valence value of 3, such as yttrium ($Y^{3+}$), lanthanum ($La^{3+}$), cerium ($Ce^{3+}$), samarium ($Sm^{3+}$), dysprosium ($Dy^{3+}$) and antimony ($Sb^{3+}$), and the elements having a valence value of 5, such as niobium ($Nb^{5+}$), tantalum ($Ta^{5+}$) and bismuth ($Bi^{5+}$), and the mixture thereof. The typical doping agent is an oxide of a rare earth element.

A process for manufacturing the semiconductive barium titanate of this invention typically comprises material formulation, wet mixing, dehydration and drying, calcining, pulverization, granulation, molding and baking. In order to prevent inclusion of impurities during the steps of wet mixing and pulverization, it is desirable to use a stainless steel pot lined with urethane rubber, and an agate ball. Calcining is carried out at a temperature, of, say, 900° C. to 1,100° C. in order to synthesize barium titanate ($BaTiO_3$), and to densify the final baked product. Silicon nitride, titanium nitride, zirconium nitride or silicon carbide may be added either during the formulation of the materials, or during the pulverization of the calcined product.

The invention will now be described with reference to examples.

EXAMPLE 1

This example compares the relation between the baking temperature for the known barium-yttrium titanate ($Ba_{1-x}Y_xTiO_3$) and its specific resistivity at ordinary room temperature, and the relation between the baking temperature for the barium yttrium titanate to which silicon nitride was added in accordance with this invention, and its specific resistivity at ordinary room temperature.

After baking at various temperatures, the specific resistivity at ordinary room temperature was measured of each of the three compositions shown in TABLE 1, i.e., the conventional semiconductive barium-yttrium titanate ($Ba_{1-x}Y_xTiO_3$) ceramic composition prepared from barium carbonate, yttrium oxide and titanium oxide, in which x was 0.003, a comparative composition comprising $Ba_{0.997}Y_{0.003}TiO_3$ and precipitated silicon dioxide, and a composition of the invention comprising $Ba_{0.997}Y_{0.003}TiO_3$ and pulverized silicon nitride having a particle size not exceeding 0.2 micron. Each composition was prepared by mixing in a ball mill lined with urethane rubber, and having an agate ball. The mixture was calcined at 1,100° C. for two hours. The calcined product was fully pulverized by the ball mill. The pulverized product was placed in a mold having an inside diameter of 20 mm, and pressed at a pressure of 600 kg/cm² to yield compacted products having a thickness of 3 mm and a diameter of 20 mm.

TABLE 1

| No. | Composition | Specific resistivity of sintered product (Ωcm) | | | | | | | |
|---|---|---|---|---|---|---|---|---|---|
| | | 1240° C. | 1260° C. | 1280° C. | 1300° C. | 1320° C. | 1340° C. | 1360° C. | 1380° C. |
| 1 | $Ba_{0.997}Y_{0.003}TiO_3$ + 0.005 w/o $Si_3N_4$ | $7.2 \times 10^1$ | $1.0 \times 10^1$ | $1.0 \times 10^1$ | $1.0 \times 10^1$ | $1.0 \times 10^1$ | $1.0 \times 10^1$ | — | — |
| 2 | $Ba_{0.997}Y_{0.003}TiO_3$ + 1 w/o $SiO_2$ | $>10^7$ | $>10^7$ | $10^5$ | $10^3$ | $10^2$ | $3.2 \times 10^1$ | $2.0 \times 10^1$ | $2.0 \times 10^1$ |
| 3 | $Ba_{0.997}Y_{0.003}TiO_3$ | $>10^7$ | $>10^7$ | $10^6$ | $10^4$ | $10^3$ | $2.0 \times 10^2$ | $2.3 \times 10^1$ | $3.3 \times 10^1$ |

The compacted products were baked for an hour at various temperatures in the range of 1,240° C. to 1,380° C. as shown in TABLE 1. The specific resistivity of the baked product was measured at ordinary room temperature (20° C.). The baking temperature and the specific resistivity are shown in TABLE 1.

As is obvious from TABLE 1, the composition containing silicon nitride could be rendered semiconductive and sintered at a temperature which was about 100° C. lower than in the case of the other compositions. This is probably due to the formation of anion vacancies by $N^{3-}$ ions in the semiconductor. The pressure in the sintered product of silicon nitride in a solid solution in barium titanate crystals was confirmed by IMMA (ion-micro mass analyzer).

EXAMPLE 2

This example shows the relation between the quantity of silicon nitride added to the conventional semiconductive barium-yttrium titanate ($Ba_{1-x}Y_xTiO_3$) and the specific resistivity at ordinary room temperature of the barium titanate thereby obtained.

The effect of silicon nitride was examined by adding in various quantities to semiconductive barium titanate doped with 0.3 atom % of yttrium (Y). The procedures of EXAMPLE 1 were repeated for preparing the semiconductive ceramics. TABLE 2 shows the specific resistivity at 20° C. of the sintered products obtained by baking at 1,280° C. for an hour. The barium titanate doped with 0.3 atom % of yttrium, not containing silicon nitride, and baked at 1,280° C. showed an extremely high specific resistivity ($10^6$ Ωcm) at 20° C., as shown at No. 3 in TABLE 1. The specific resistivity could be lowered to about 20 Ωcm only when the baking temperature was raised to about 1,350° C.

TABLE 2

| Sample No. | Chemical Composition | | Specific resistivity at 20° C. (Ωcm) |
|---|---|---|---|
| | Semiconductive barium titanate composition | Quantity of silicon nitride (wt. %) | |
| 1 | $Ba_{0.997}Y_{0.003}TiO_3$ | 0.01 | $3 \times 10^3$ |
| 2 | " | 0.02 | $2 \times 10^2$ |
| 3 | " | 0.05 | $2 \times 10$ |
| 4 | " | 0.10 | $1 \times 10$ |
| 5 | " | 0.20 | $1 \times 10$ |
| 6 | " | 0.50 | $1 \times 10$ |
| 7 | " | 1.00 | $1 \times 10$ |
| 8 | " | 2.00 | $1 \times 10$ |
| 9 | " | 3.00 | $2 \times 10$ |

TABLE 2-continued

| Sample No. | Chemical Composition | | Specific resistivity at 20° C. ($\Omega$cm) |
|---|---|---|---|
| | Semiconductive barium titanate composition | Quantity of silicon nitride (wt. %) | |
| 10 | " | 5.00 | $3 \times 10^2$ |

As shown in TABLE 2, however, the addition of only 0.01% by weight of silicon nitride was effective for lowering specific resistivity, and the use of 0.1% by weight of silicon nitride produced semiconductive ceramics having a very low specific resistivity. The increase in the quantity of silicon nitride to about 5% by weight did not bring about any substantial change in specific resistivity. Thus, it was possible to manufacture semiconductive barium titanate doped with yttrium by employing a widely differing quantity of silicon nitride at a considerably lower baking temperature than when no silicon nitride was added.

EXAMPLE 3

This example compares the relation between the quantity of yttrium (y) in the conventional barium-yttrium titanate ($Ba_{1-x}Y_xTiO_3$) and its specific resistivity at ordinary room temperature, and the relation between the quantity of yttrium (Y) in the barium titanate of this invention containing silicon nitride and its specific resistivity at ordinary room temperature.

TABLE 3 shows the specific resistivity at 20° C. of barium titanate doped with various quantities of yttrium (Y). TABLE 3 indicates low specific resistivity only in a very narrow range of yttrium (Y) concentration. Barium titanate doped with 0.3 atom % of yttrium (Y) showed the minimum specific resistivity, while barium titanate doped with 0.6 atom % of yttrium was substantially an insulator.

TABLE 4 shows the specific resistivity of barium titanate containing 0.5% by weight of silicon nitride ($Si_3N_4$), and doped with different quantities of yttrium. As is obvious from TABLE 4, the use of silicon nitride could maintain a very low specific resistivity in barium titanate doped with even 0.6 atom % of yttrium.

It is, thus, noted that the use of silicon nitride ($Si_3N_4$) not only lowers the baking temperature at which the barium titanate is rendered semiconductive as stated in EXAMPLE 1, but also contributes to widening the range of quantity in which the doping agent, yttrium, can be employed.

TABLE 3

| No. | Barium titanate composition | Specific resistivity at 20° C. ($\Omega$cm) |
|---|---|---|
| 1 | $Ba_{0.999}Y_{0.001}TiO_3$ | $1.6 \times 10^5$ |
| 2 | $Ba_{0.998}Y_{0.002}TiO_3$ | $2.0 \times 10^4$ |
| 3 | $Ba_{0.997}Y_{0.003}TiO_3$ | $2.3 \times 10^1$ |
| 4 | $Ba_{0.996}Y_{0.004}TiO_3$ | $6.8 \times 10^1$ |
| 5 | $Ba_{0.994}Y_{0.006}TiO_3$ | $3.0 \times 10^5$ |
| 6 | $Ba_{0.992}Y_{0.008}TiO_3$ | $4.0 \times 10^6$ |

TABLE 4

| No. | Chemical composition | | Specific resistivity at 20° C. ($\Omega$cm) |
|---|---|---|---|
| | Semiconductive barium titanate composition | Quantity of silicon nitride (wt. %) | |
| 1 | $Ba_{0.997}Y_{0.003}TiO_3$ | 0.5 | $1 \times 10$ |
| 2 | $Ba_{0.996}Y_{0.004}TiO_3$ | 0.5 | " |
| 3 | $Ba_{0.995}Y_{0.005}TiO_3$ | 0.5 | " |
| 4 | $Ba_{0.994}Y_{0.006}TiO_3$ | 0.5 | " |

TABLE 4-continued

| No. | Chemical composition | | Specific resistivity at 20° C. ($\Omega$cm) |
|---|---|---|---|
| | Semiconductive barium titanate composition | Quantity of silicon nitride (wt. %) | |
| 5 | $Ba_{0.993}Y_{0.007}TiO_3$ | 0.5 | $2 \times 10$ |

EXAMPLE 4

This example shows the relation between the additive incorporated in accordance with this invention into the various conventional barium titanate semiconductors, i.e., barium-lanthanum titanate ($Ba_{1-x}La_xTiO_3$), barium-cerium titanate ($Ba_{1-x}Ce_xTiO_3$), barium-samarium titanate ($Ba_{1-x}Sm_xTiO_3$), barium-antimony titanate ($Ba_{1-x}Sb_xTiO_3$), barium-niobium titanate ($Ba_{1-x}Nb_xTiO_3$), and barium-bismuth titanate ($Ba_{1-x}Bi_xTiO_3$), and their specific resistivity at ordinary room temperature.

Barium titanate doped with 0.6 atom % of lanthanum (La), cerium (Ce), samarium (Sm), antimony (sb), niobium Nb) or bismuth (Bi) showed a specific resistivity of $6 \times 10^5$, $7 \times 10^6$, $3 \times 10^6$, $4 \times 10^5$, $7 \times 10^5$ or $4 \times 10^6$ $\Omega$cm, respectively. TABLE 5 shows the specific resistivity at 20° C. of the semiconductive barium titanate obtained by adding 0.5% by weight of silicon nitride to each of the above barium titanate compositions, and baking it at 1,280° C. for an hour as shown in EXAMPLE 1.

TABLE 5

| No. | Chemical composition | | Specific resistivity at 20° C. ($\Omega$cm) |
|---|---|---|---|
| | Semiconductive barium titanate composition | Quantity of silicon nitride (wt. %) | |
| 1 | $Ba_{0.994}La_{0.006}TiO_3$ | 0.5 | $1 \times 10$ |
| 2 | $Ba_{0.994}Ce_{0.006}TiO_3$ | " | $2 \times 10$ |
| 3 | $Ba_{0.994}Sm_{0.006}TiO_3$ | " | $2 \times 10$ |
| 4 | $Ba_{0.994}Sb_{0.006}TiO_3$ | " | $1.5 \times 10$ |
| 5 | $Ba(Ti_{0.994}Nb_{0.006})O_3$ | " | $2 \times 10$ |
| 6 | $Ba(Ti_{0.994}Bi_{0.006})O_3$ | " | $3 \times 10$ |

TABLE 5 indicates that the use of 0.5% by weight of silicon nitride contributes to enabling the use of the various doping elements in a wide range of quantity as in case yttrium was used as the doping element. All of these barium titanate semiconductors showed an outstanding PTC characteristic, and the value of $\rho max/\rho R.T$ was around $10^{4 \sim 5}$, where $\rho max$ designates the maximum value of specific resistivity in the PTC temperature region and $\rho R.T$ designates the specific resistivity at ordinary room temperature.

EXAMPLE 5

This example compares the relation between the baking temperature of the conventional semiconductive barium-yttrium titanate ($Ba_{1-x}Y_xTiO_3$) and its specific resistivity at ordinary room temperature, and the relation between the baking temperature of the products of this invention containing titanium nitride, zirconium nitride or silicon carbide and their specific resistivity at ordinary room temperature.

Figure 1:
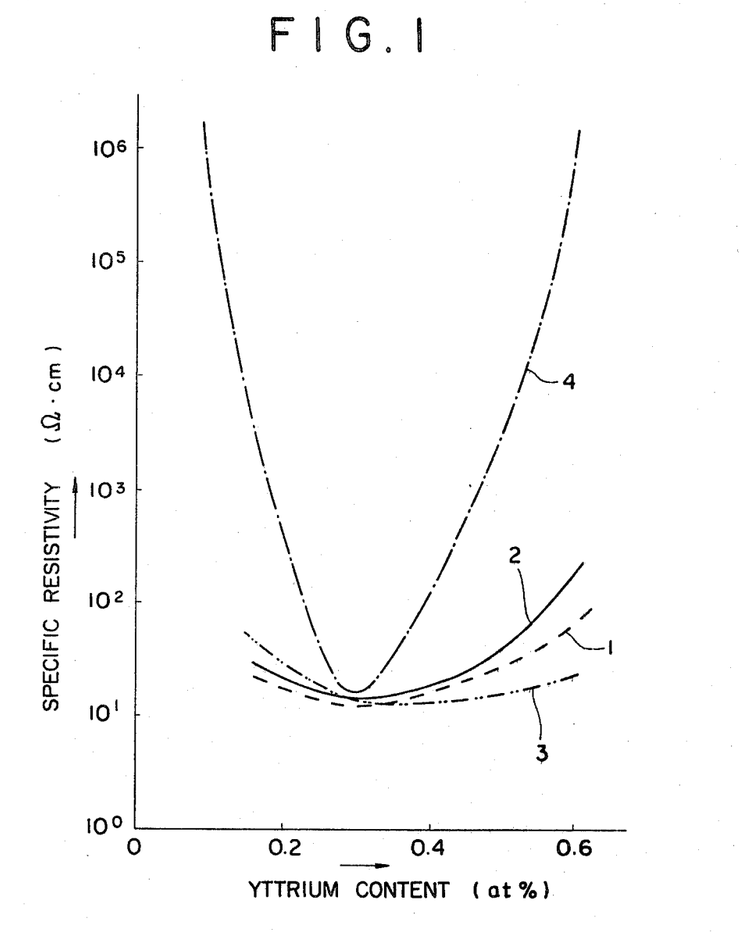
FIG. 1 is a graph showing the relation obtained in EXAMPLE 6 between the quantity of yttrium employed, and the specific resistivity of the ceramics at ordinary room temperature.

The specific resistivity at ordinary room temperature was measured of each of the conventional barium-yttrium titanate ($Ba_{0.997}Y_{0.003}TiO_3$), and compositions comprising $Ba_{0.997}Y_{0.003}TiO_3$ and titanium nitride (TiN), zirconium nitride (ZrN) and silicon carbide (SiC), respectively, which were baked at several baking temperatures as shown in TABLE 6. Barium-yttrium titanate was prepared from barium carbonate, yttrium oxide and titanium oxide.

product and its specific resistivity at ordinary room temperature is shown in FIG. 1, in which curve 1 designates the product containing titanium nitride, curve 2

TABLE 6

| No. | Composition | Specific resistivity of sintered product ($\Omega$cm) | | | | | | | |
|---|---|---|---|---|---|---|---|---|---|
| | | 1240° C. | 1260° C. | 1280° C. | 1300° C. | 1320° C. | 1340° C. | 1360° C. | 1380° C. |
| 1 | $Ba_{0.997}Y_{0.003}TiO_3$ + 0.5 wt. % TiN | $>10^7$ | $>10^7$ | $10^5$ | $3.2 \times 10^1$ | $1.9 \times 10^1$ | $2.1 \times 10^1$ | $2.2 \times 10^1$ | $2.2 \times 10^1$ |
| 2 | $Ba_{0.997}Y_{0.003}TiO_3$ + 0.5 wt. % ZrN | $>10^7$ | $>10^7$ | $3.6 \times 10^2$ | $3.1 \times 10^1$ | $2.5 \times 10^1$ | $2.1 \times 10^1$ | $1.8 \times 10^1$ | $2.1 \times 10^1$ |
| 3 | $Ba_{0.997}Y_{0.003}TiO_3$ + 0.5 wt. % SiC | $>10^7$ | $10^5$ | $1.9 \times 10^1$ | $2.1 \times 10^1$ | $2.3 \times 10^1$ | $2.1 \times 10^1$ | $2.0 \times 10^1$ | $2.3 \times 10^1$ |
| Comparative: | $Ba_{0.997}Y_{0.003}TiO_3$ | $>10^7$ | $>10^7$ | $10^6$ | $10^4$ | $10^3$ | $2.0 \times 10^2$ | $2.3 \times 10^1$ | $3.3 \times 10^1$ |

Titanium nitride, zirconium nitride and silicon carbide were all in the form of a powder having a particle size less than 1 micron. Each composition was prepared by mixing in a ball mill lined with urethane rubber, and having an agate ball. The mixture was calcined at a temperature of 1,100° C. for two hours. The calcined product was fully pulverized by the ball mill. The pulverized product was placed in a mold having an inside diameter of 20 mm, and pressed at a pressure of 600 kg/cm² to yield compacted products having a thickness of 3 mm and a diameter of 20 mm. The compacted products were baked for an hour at various temperatures in the range of 1,240° C. to 1,380° C. as shown in TABLE 6. The specific resistivity of the baked product was measured at ordinary room temperature (20° C.). The baking temperature and the specific resistivity are shown in TABLE 6.

As is obvious from TABLE 6, the composition including titanium nitride, zirconium nitride or silicon carbide could be rendered semiconductive and sintered even at a temperature which was 60° C. to 80° C. lower than when no such additive was employed. This is probably due to the effect to the additive on the composition of a liquid phase formed by baking.

EXAMPLE 6

This example compares the relation between the quantity of yttrium (Y) in the conventional semiconductive barium-yttrium titanate ($Ba_{1-x}Y_xTiO_3$) and its specific resistivity at ordinary room temperature, and the relation between the quantity of yttrium in the products of this invention containing titanium nitride (TiN), zirconium nitride (ZrN) and silicon carbide (SiC) and their specific resistivity at ordinary room temperature.

Barium-yttrium titanate was prepared from barium carbonate, yttrium oxide and titanium oxide, and contained 0.1 to 0.6 atom % of yttrium (Y). Titanium nitride, zirconium nitride and silicon carbide were each employed in the quantity of 1.0% by weight. All of these semiconductive ceramics were prepared in accordance with the method described in EXAMPLE 5. They were baked at a temperature of 1,380° C. The relation between the quantity of yttrium (Y) in each product and its specific resistivity at ordinary room temperature is shown in FIG. 1, in which curve 1 designates the product containing titanium nitride, curve 2 designates the product containing zirconium nitride, curve 3 designates the product containing silicon carbide, and curve 4 designates the conventional product.

As is obvious from FIG. 1, the products of this invention showed low specific resistivity over a wide range of quantity of yttrium, while the conventional product showed low specific resistivity only in a very narrow range of yttrium quantity in the vicinity of 0.3 atom %. It is, thus, noted that the use of titanium nitride, zirconium nitride and silicon carbide in accordance with this invention widens substantially the range of quantity in which the doping agent can be effectively employed.

EXAMPLE 7

This example shows the relation between the quantity of titanium nitride (TiN), zirconium nitride (ZrN) and silicon carbide (SiC) added in accordance with this invention to the convention semiconductive barium-yttrium titanate ($Ba_{1-x}Y_xTiO_3$), and the specific resistivity at ordinary room temperature of the product thereby obtained.

The various semiconductive ceramics were prepared in accordance with the method described in EXAMPLE 5 from barium titanate doped with 0.3 atom % of yttrium (Y). They were baked at a temperature of 1,300° C. for an hour. TABLE 7 shows the relation between the quantity of the various additives employed in accordance with this invention, and the specific resistivity at ordinary room temperature of the products thereby obtained.

The semiconductive barium titanate doped with 0.3 atom % of yttrium (Y), but not containing any such additive as employed according to this invention, and obtained by baking at a temperature of 1,300° C. showed an extremely high specific resistivity ($10^4$ $\Omega$cm) at 20° C., as shown in TABLE 6 for the sake of comparison. Its specific resistivity could be lowered to about 20 $\Omega$cm only when the baking temperature was raised to about 1,360° C.

TABLE 7

| Additive | Quantity of additive (wt. %) | | | | | | |
|---|---|---|---|---|---|---|---|
| | 0.05 | 0.1 | 0.5 | 1.0 | 2.0 | 3.0 | 4.0 |
| TiN | $10^3$ | $5 \times 10^1$ | $3 \times 10^1$ | $2 \times 10^1$ | $8 \times 10^1$ | $2 \times 10^3$ | $>10^6$ |
| ZrN | $10^4$ | $4 \times 10^1$ | $3 \times 10^1$ | $5 \times 10^1$ | $7 \times 10^1$ | $10^3$ | $>10^6$ |
| SiC | $10^4$ | $8 \times 10^1$ | $2 \times 10^1$ | $3 \times 10^1$ | $6 \times 10^1$ | $10^4$ | $>10^6$ |
| TiN + ZrN | — | — | — | $5 \times 10^1$ | — | — | — |
| ZrN + SiC | — | — | — | $6 \times 10^1$ | — | — | — |
| SiC + TiN | — | — | — | $3 \times 10^1$ | — | — | — |

As is obvious from TABLE 7, however, the specific resistivity of the product could be lowered if 0.1% by weight of at least one of titanium nitride, zirconium nitride and silicon carbide was added, and the increase in the quantity of any such additive to about 2.0% by weight did not bring about any substantial change in the specific resistivity of the product. Thus, this invention makes it possible to produce semiconductive barium titanate doped with yttrium (Y) by employing a widely different quantity of any such additive at a considerably lower temperature than when no such additive is used. The specific resistivity of the product, however, increased when 3.0% by weight or more of the additive were employed. It is, therefore, advisable to employ any such additive in the quantity of 0.1 to 2.0% by weight.

TABLE 7 also shows the specific resistivity at ordinary room temperature of the semiconductive ceramics obtained by employing 0.5% by weight each of two additives together. TABLE 7 indicates that it is as effective to use a mixture of two additives as to use a single additive.

EXAMPLE 8

This example shows the relation between the quantity of each of titanium nitride (TiN), zirconium nitride (ZrN) and silicon carbide (SiC) added in accordance with this invention to the conventional semiconductive barium-yttrium titanate ($Ba_{1-x}Y_xTiO_3$), and the specific resistivity ratio ($\rho max/\rho min$) of the product.

The various semiconductive ceramics were prepared in accordance with the method described in EXAMPLE 5 by adding various quantities of additives to semiconductive barium titanate doped with 0.3 atom % of yttrium (Y). They were baked at a temperature of 1,380° C. The relation between the quantity of the additive and specific resistivity ratio of the product is shown in FIG. 2, in which curve 5 designates the product obtained by employing titanium nitride, curve 6 designates the product obtained by employing zirconium nitride, and curve 7 designates the product obtained by employing silicon carbide, while curve 8 designates the conventional product.

Figure 2:
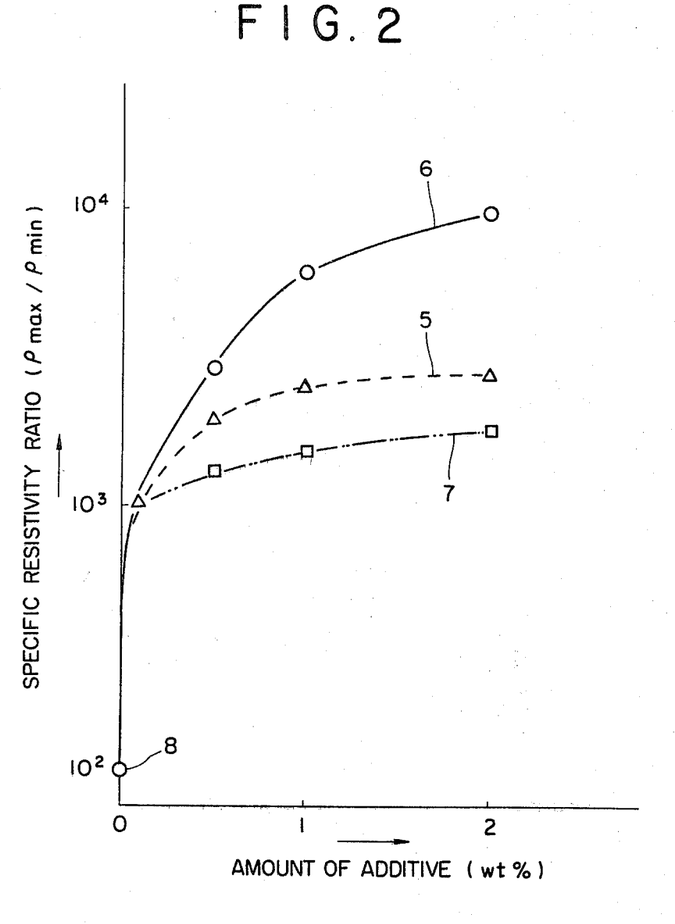
FIG. 2 is a graph showing the relation obtained in EXAMPLE 8 between the quantity of the additive employed and the specific resistivity ratio ($\rho$max/$\rho$min)

As is obvious from FIG. 2, the products of this invention showed a specific resistivity ratio of $10^3$ to $10^4$ over a wide range of additive quantity between 0.1 and 2.0% by weight, which is a great improvement over that of $10^2$ in the conventional product (8 in FIG. 2).

EXAMPLE 9

This example shows the relation between the quantity of titanium nitride (TiN), zirconium nitride (ZrN) and silicon carbide (SiC) added in accordance with this invention to the conventional semiconductive barium-yttrium titanate ($Ba_{1-x}Y_xTiO_3$), and the steepness or variation in the specific resistivity ($\Delta\rho/\Delta T$) of the product in the PTC temperature region.

Figure 3:
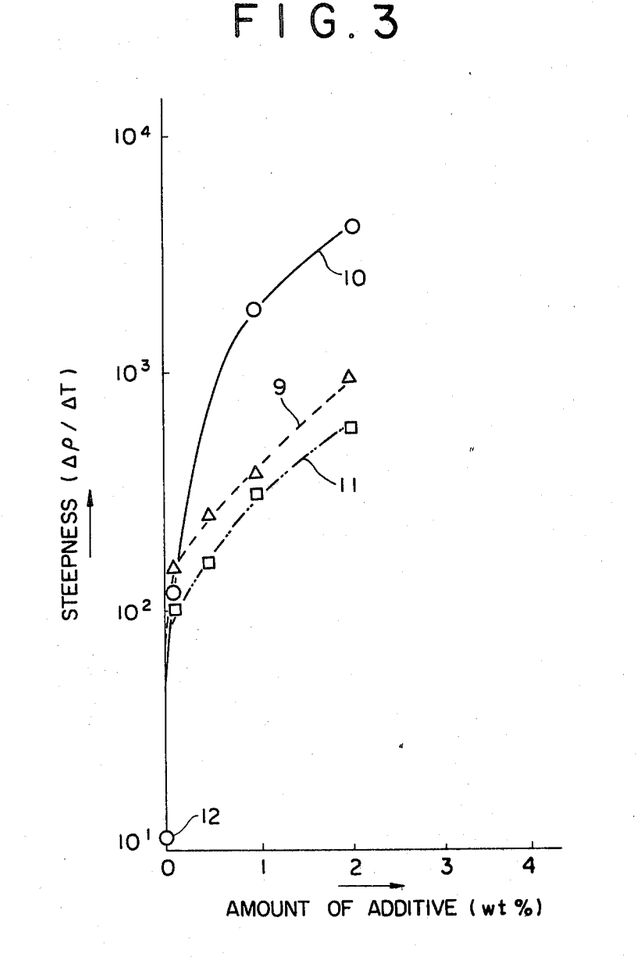
FIG. 3 is a graph showing the relation obtained in EXAMPLE 9 between the quantity of the additive employed and the steepness or the variation in specific resistivity ($\Delta\rho/\Delta T$) in the PTC temperature region.

The semiconductive ceramics obtained in EXAMPLE 8 were used as the samples. The relation between the quantity of the additive and the variation in specific resistivity in the PTC temperature region is shown in FIG. 3, in which curve 9 designates the product obtained by employing titanium nitride, curve 10 designates the product obtained by employing zirconium nitride, and curve 11 designates the product obtained by employing silicon carbide, while point 12 designates the conventional product. As is obvious from FIG. 3, the use of the additives in a wide range of quantity between 0.1 and 2.0% by weight improves the value of $\Delta\rho/\Delta T$ substantially. This means a sharp rise in the variation of specific resistivity of the products according to this invention.

EXAMPLE 10

This example shows the relation between the additive incorporated in accordance with this invention into various conventional semiconductive ceramics, i.e., barium-lanthanum titanate ($Ba_{1-x}La_xTiO_3$), barium-cerium titanate ($Ba_{1-x}Ce_xTiO_3$) and barium-antimony titanate ($Ba_{1-x}Sb_xTiO_3$), and the specific resistivity of the product at ordinary room temperature.

Barium titanate doped with 0.6 atom % of lanthanum (La), cerium (Ce) and antimony (Sb) showed specific resistivity of $10^5$, $10^6$ and $10^5$ Ωcm, respectively. The various semiconductive ceramics were, then, prepared in accordance with the method described in EXAMPLE 5 by adding 0.5% by weight of titanium nitride (TiN), zirconium nitride (ZrN) and silicon carbide (SiC), respectively. They were baked at a temperature of 1,300° C. for an hour. Table 8 shows the relation between the additive employed and the specific resistivity of the product at ordinary room temperature.

As is obvious from TABLE 8, the use of 0.5% by weight of the additive according to this invention served to widen the range of quantity in which the various doping elements could be employed effectively, as was the case when yttrium (Y) was used as the doping element. These semiconductive barium titanate ceramics show an outstanding PTC characteristics such that $\rho max/\rho min$ is $10^3$ to $10^4$.

TABLE 8

| Semiconductive barium titanate composition | Specific resistivity (Ωcm) Additive | | |
|---|---|---|---|
|  | TiN | ZrN | SiC |
| $Ba_{0.994}La_{0.006}TiO_3$ | $2 \times 10^1$ | $4 \times 10^1$ | $3 \times 10^1$ |
| $Ba_{0.994}Ce_{0.006}TiO_3$ | $2 \times 10^1$ | $2 \times 10^1$ | $1 \times 10^1$ |
| $Ba_{0.994}Sb_{0.006}TiO_3$ | $3 \times 10^1$ | $5 \times 10^1$ | $7 \times 10^1$ |

What is claimed as new and intended to be covered by Letters Patent is:

1. Semiconductive barium titanate ceramic having a positive temperature coefficient of resistance, comprising a barium titanate semiconductor consisting essentially of barium titanate and a doping element selected from the group consisting of yttrium, lanthanum, cerium, samarium, dysprosium, antimony, niobium, tantalum and bismuth, and at least one additive selected from the group consisting of silicon nitride, titanium nitride, zirconium nitride and silicon carbide, said additive being present in an amount sufficient to effect a specific resistivity at 20° C. that is lower than the resistivity of said doped barium titanate absent the additive.

2. Semiconductive barium titanate according to claim 1, wherein the amount of said silicon nitride is in the range of from 0.01 to 5.0% by weight of said barium titanate semiconductor.

3. Semiconductive barium titanate according to claim 1, wherein the amount of at least one of said titanium nitride, zirconium nitride and silicon carbide is in the range of from 0.1 to 2.0% by weight of said barium titanate semiconductor.

4. Semiconductive barium titanate according to claim 1, wherein said doping element has a valence of 3.

5. Semiconductive barium titanate according to claim 1, wherein said doping element has a valence of 5.

6. Semiconductive barium titanate according to claim 4, wherein said doping element is selected from the group consisting of yttrium, lanthanum, cerium, samarium, dysprosium and antimony.

7. Semiconductive barium titanate according to claim 5, wherein said doping element is selected from the group consisting of nobium, tantalum and bismuth.

8. Semiconductive barium tatanate according to claim 1, wherein said doping element is yttrium, and said additive is silicon nitride.

9. Semiconductive barium titanate according to claim 1, wherein said doping element is yttrium, and said additive is at least one member selected from the group consisting of titanium nitride, zirconium nitride and silicon carbide.

10. Semiconductive barium titanate according to claim 1, wherein said doping element is selected from the group consisting of lanthanum, cerium, samarium, antimony, bismuth and niobium, and said additive is silicon nitride.

11. Semiconductive barium titanate according to claim 1, wherein said doping element is selected from the group consisting of lanthanum, cerium and antimony, and said additive is selected from the group consisting of titanium nitride, zirconium nitride and silicon carbide.

* * * * *

UNITED STATES PATENT AND TRADEMARK OFFICE
CERTIFICATE OF CORRECTION

PATENT NO. : 4,384,989
DATED : May 24, 1983
INVENTOR(S) : Osami Kamigaito, Tatsumi Hoiki, Nobuyuki Yamamoto, Yoshiharu Hirose, Haruo Doi It is certified that error appears in the above—identified patent and that said Letters Patent is hereby corrected as shown below:

In claim 7, line 3, change "nobium" to -- niobium --.

In claim 8, line 1, change "tatanate" to -- titanate --.

Signed and Sealed this

Twenty-second Day of January 1985

[SEAL]

Attest:

DONALD J. QUIGG

*Attesting Officer*  *Acting Commissioner of Patents and Trademarks*